(12) United States Patent
Piasse et al.

(10) Patent No.: US 8,379,224 B1
(45) Date of Patent: Feb. 19, 2013

(54) PRISMATIC ALIGNMENT ARTIFACT

(75) Inventors: Michael Louis Piasse, St. Charles, MO (US); John Costello, Derby, KS (US); Mike D. Cleland, Wichita, KS (US)

(73) Assignee: The Boeing Company, Chicago, IL (US)

( * ) Notice: Subject to any disclaimer, the term of this patent is extended or adjusted under 35 U.S.C. 154(b) by 501 days.

(21) Appl. No.: 12/562,427

(22) Filed: Sep. 18, 2009

(51) Int. Cl.
*G01B 11/30* (2006.01)
*G01B 11/14* (2006.01)
*G06F 19/00* (2011.01)

(52) U.S. Cl. ......... 356/601; 356/614; 356/620; 700/195
(58) Field of Classification Search .................. 356/601, 356/608, 611, 614, 620; 700/195
See application file for complete search history.

(56) References Cited

U.S. PATENT DOCUMENTS

| | | | | |
|---|---|---|---|---|
| 4,714,339 A * | 12/1987 | Lau et al. ...................... 356/4.09 |
| 4,764,668 A * | 8/1988 | Hayard ........................... 235/470 |
| 5,440,392 A * | 8/1995 | Pettersen et al. ............... 356/620 |
| 5,663,795 A * | 9/1997 | Rueb .............................. 356/614 |
| 5,748,505 A * | 5/1998 | Greer ............................. 702/104 |
| 6,017,125 A * | 1/2000 | Vann .............................. 359/529 |
| 6,166,809 A * | 12/2000 | Pettersen et al. ............... 356/612 |
| 6,339,683 B1 * | 1/2002 | Nakayama et al. ............ 396/429 |
| 6,484,381 B2 * | 11/2002 | Cunningham et al. ...... 29/407.09 |
| 6,644,897 B2 * | 11/2003 | Martinez et al. ............... 408/1 R |
| 6,901,673 B1 * | 6/2005 | Cobb et al. ....................... 33/502 |
| 6,990,215 B1 * | 1/2006 | Brown et al. ................... 382/106 |
| 7,145,647 B2 * | 12/2006 | Suphellen et al. .......... 356/141.1 |
| 7,180,607 B2 * | 2/2007 | Kyle et al. ...................... 356/614 |
| 7,206,080 B2 * | 4/2007 | Kochi et al. .................... 356/611 |
| 7,307,737 B1 * | 12/2007 | Kling et al. .................... 356/614 |
| 7,414,732 B2 * | 8/2008 | Maidhof et al. ............... 356/601 |
| 7,454,265 B2 * | 11/2008 | Marsh ........................... 700/195 |
| 7,557,936 B2 * | 7/2009 | Dickinson ..................... 356/620 |
| 7,587,258 B2 * | 9/2009 | Marsh et al. .................. 700/195 |
| 7,614,154 B2 * | 11/2009 | Cobb ............................. 33/1 BB |
| 7,643,893 B2 * | 1/2010 | Troy et al. ....................... 700/65 |
| 7,661,199 B2 * | 2/2010 | Marsh et al. ..................... 33/293 |
| 8,055,466 B2 * | 11/2011 | Bryll ............................... 702/85 |
| 2003/0090682 A1 * | 5/2003 | Gooch et al. .................. 356/620 |
| 2006/0007452 A1 * | 1/2006 | Gaspard et al. ............... 356/620 |
| 2006/0227210 A1 * | 10/2006 | Raab et al. ..................... 348/139 |
| 2007/0016386 A1 * | 1/2007 | Husted ........................... 702/150 |
| 2007/0242280 A1 * | 10/2007 | Dickinson ..................... 356/620 |
| 2007/0267498 A1 | 11/2007 | Marsh et al. |
| 2007/0269098 A1 | 11/2007 | Marsh |
| 2008/0123110 A1 * | 5/2008 | Dickinson et al. ............ 356/620 |
| 2009/0006031 A1 | 1/2009 | Marsh |

* cited by examiner

*Primary Examiner* — Roy M Punnoose
(74) *Attorney, Agent, or Firm* — Hanley, Flight & Zimmerman, LLC

(57) ABSTRACT

A prismatic alignment artifact includes an artifact body having a prismatic shape.

22 Claims, 4 Drawing Sheets

PRISMATIC ALIGNMENT ARTIFACT

TECHNICAL FIELD

The present disclosure generally relates to three-dimensional scanning systems. More particularly, the present disclosure relates to a prismatic alignment artifact having a prismatic shape and features for best-fit alignment of adjacent three-dimensional laser and white light scans and alignment of the scan data into a global coordinate system.

BACKGROUND

In the three-dimensional scanning of large objects, the current methods used to perform best fit alignment scans from large data sets collected from high speed, long range laser scanners are largely inefficient. No accurate method to integrate the data from the scans with data from other types of scanners and single-point measurement devices is known to exist. The current solution to best fitting of adjacent scans may involve location of three or more common points in the data for the initial fit and best fitting the data using overlapping data. Currently, large spherical artifacts are used which allow data to slip along incomplete spherical surfaces due to multiple possible fit solutions. However, it may be difficult to pick common points along the spherical surface of the artifacts. Scan data may be most accurate when the laser beam is perpendicular to the artifact surface. Perpendicularity, however, diminishes rapidly along a spherical surface of the artifact. To position the aligned scans to the global coordinate system, it may be required that features such as hole center lines be extracted from the scan data to perform the transformation. Spherical artifacts may lack provisions to integrate with other scanning and measurement devices. Alignment of scan or measurement data to a global coordinate system may be performed manually with questionable accuracy.

Locating common points in large scans may be difficult especially when features are similar throughout the data. When commercial best fit alignment software attempts to align the scans using overlapping data, alignment error may be magnified as the distance from the overlapping area increases. The limited accuracy achieved with the spherical artifacts may do little to alleviate the fit error. It may be a laborious process to attempt to extract discrete features such as hole centerlines or "golden rivet locations" from scan data. Accuracy of the alignment to the global coordinate may be highly suspect to the accuracy of the feature extraction and due to the lack of fitting the data to the entire envelope of the subject.

Therefore, a prismatic alignment artifact is needed which may facilitate recognition of common points in adjacent scans for initial alignment of the scan data; which may facilitate measurement of artifact locations with high-precision devices to allow accurate positive location relative to a global coordinate system; which may facilitate ease in integrating data from multiple scanner types; and which may be easier to mount to a surface due to its shape.

SUMMARY

The present disclosure is generally directed to a prismatic alignment artifact. An illustrative embodiment of the prismatic alignment artifact includes an artifact body having a prismatic shape.

In some embodiments, the prismatic alignment artifact may include an artifact body having a prismatic shape and including a generally planar attachment surface, a generally planar apex surface spaced-apart from the attachment surface, a plurality of generally planar artifact faces extending between the attachment surface and the apex surface and an adaptor opening provided in the apex surface.

The present disclosure is further generally directed to a method of measuring a surface. An illustrative embodiment of the method may include providing a plurality of prismatic alignment artifacts each having a prismatic artifact body, distributing the prismatic alignment artifacts over a surface to be measured, measuring locations of the prismatic alignment artifacts on the surface to be measured, measuring locations of known features on the surface to be measured, transforming the locations of the prismatic alignment artifacts in a global coordinate system, collecting adjacent point clouds of the surface to be measured, performing "point pairs" alignment to achieve semi-accurate alignment of the adjacent point clouds and performing "best fit" alignment to achieve accurate alignment of the adjacent point clouds.

In some embodiments, the prismatic alignment artifact may include an artifact body having a prismatic shape and including a generally planar attachment surface; a generally planar apex surface spaced-apart from the attachment surface; six generally planar artifact faces extending between the attachment surface and the apex surface with adjacent ones of the artifact faces disposed at an obtuse angle with respect to each other; base edges defined between the attachment surface and the artifact faces, respectively; at least one pry notch provided in at least one of the base edges; and artifact openings provided in alternating ones of the artifact faces. The artifact openings may include one artifact opening provided in a first one of the alternating ones of the artifact faces, two artifact openings provided in a second one of the alternating ones of the artifact faces and three artifact openings provided in a third one of the alternating ones of the artifact faces. An adaptor opening may be provided in the apex surface and a metrology device may be inserted in the adaptor opening.

In some embodiments, the method of measuring a surface may include providing a plurality of prismatic alignment artifacts each having a prismatic artifact body including a generally planar attachment surface; a generally planar apex surface spaced-apart from the attachment surface; six generally planar artifact faces extending between the attachment surface and the apex surface with adjacent ones of the artifact faces disposed at an obtuse angle with respect to each other; base edges defined between the attachment surface and the artifact faces, respectively; at least one pry notch provided in at least one of the base edges; and artifact openings provided in alternating ones of the artifact faces. The artifact openings may include one artifact opening provided in a first one of the alternating ones of the artifact faces, two artifact openings provided in a second one of the alternating ones of the artifact faces and three artifact openings provided in a third one of the alternating ones of the artifact faces. An adaptor opening may be provided in the apex surface and a single point metrology device may be inserted in the adaptor opening. The prismatic alignment artifacts may be distributed over an aircraft surface to be measured. XYZ locations of the adaptor openings of the prismatic alignment artifacts, respectively, on the aircraft surface to be measured may be measured using at least one of laser tracking and photogrammetry methods. XYZ locations of known features on the surface to be measured may be measured. The XYZ locations of the prismatic alignment artifacts may be transformed in a global coordinate system. Adjacent point clouds of the surface to be measured may be collected by performing scans using at least one of a laser scanner and a white light scanner. "Point pairs" alignment may be performed to achieve semi-accurate alignment of the adjacent point clouds. "Best fit" alignment may be performed to achieve accurate alignment of the adjacent point clouds. The prismatic alignment artifacts may be removed from the aircraft surface to be measured and the prismatic alignment artifacts may be stacked.

BRIEF DESCRIPTION OF THE ILLUSTRATIONS

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Furthermore, there is no intention to be bound by any expressed or implied theory presented in the preceding technical field, background, brief summary or the following detailed description.

Figure 3:
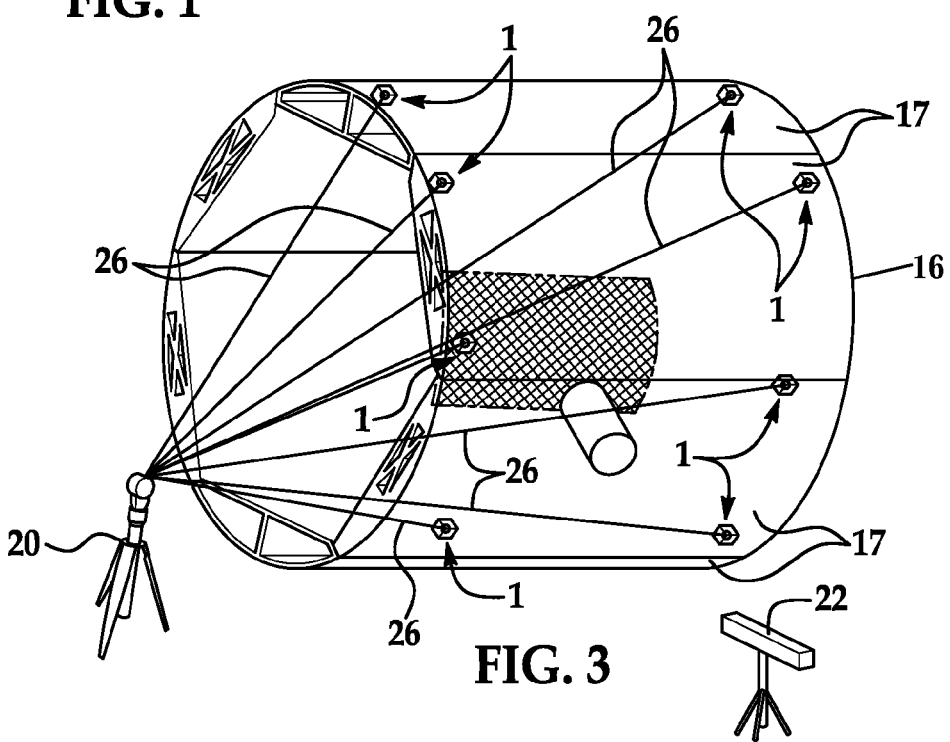
FIG. 3 is a perspective view of a section of an aircraft fuselage, with multiple prismatic alignment artifacts provided on the fuselage to measure the surface of the fuselage in implementation of an illustrative embodiment of the prismatic alignment artifact.

Referring to the drawings, an illustrative embodiment of the prismatic alignment artifact is generally indicated by reference numeral 1. As shown in FIG. 3 and will be hereinafter described, in some applications the prismatic artifact 1 may be suitable for distribution or placement over fuselage panels 17 of an aircraft fuselage 16 to facilitate three-dimensional scanning or measurement of the aircraft fuselage 16. In other applications, the prismatic artifact 1 may be suitable for three-dimensional scanning or measurement of a surface or surfaces in non-aircraft applications. One or more locations of the prismatic artifacts 1 may be measured using one or multiple laser tracking devices 20 with a laser scanner 22. The measured locations of the prismatic artifacts 1 may be utilized to determine the three-dimensional scans or measurements of the aircraft fuselage 16.

Figure 2:
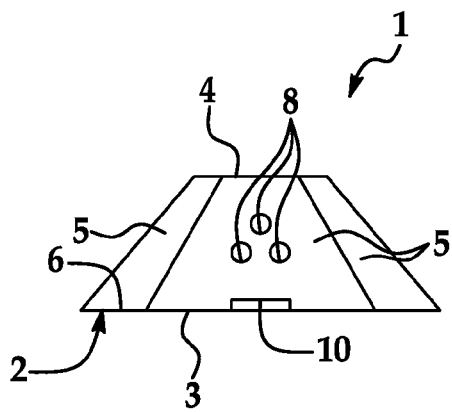
FIG. 2 is a side view of an illustrative embodiment of the prismatic alignment artifact.

The prismatic alignment artifact 1 may include an artifact body 2 having a prismatic shape and may be steel, glass, plastic or other suitable material. In some embodiments, the artifact body 2 may have a generally flat or planar attachment surface 3. A generally flat or planar apex surface 4 may be spaced-apart and generally parallel to the attachment surface 3. In some embodiments, the apex surface 4 may have a diameter of about 2 inches. In other embodiments, the apex surface 4 may have a larger or smaller diameter. Multiple, adjacent, generally flat or planar artifact faces 5 may extend between the attachment surface 3 and the apex surface 4. Base edges 6 may be defined where the attachment surface 3 meets the respective artifact faces 5. The artifact body 2 may have any number of artifact faces 5. In some embodiments, the artifact body 2 may have six artifact faces 5, with the adjacent artifact faces 5 of the artifact body 2 disposed at an obtuse angle with respect to each other. In other embodiments, the artifact body 2 may have a greater or lesser number of artifact faces 5. As shown in FIG. 2, in some embodiments a pry notch 10 may be provided in one or more of the base edges 6 of the artifact body 2 for purposes which will be hereinafter described.

In some embodiments, at least one face identifying feature 8 may be provided on at least one of the artifact faces 5 of the artifact body 2. In some embodiments, each face identifying feature 8 may be an artifact opening which may have a diameter of about ½" in some embodiments and a larger or smaller diameter in other embodiments. In other embodiments, each face identifying feature 8 may be any other suitable type of identifying or distinguishing marking, indicia or feature which is known by those skilled in the art. The face identifying feature or features 8 on each artifact face 5 may be different from the face identifying feature or features 8 on the other artifact faces 5 to visually distinguish the artifact faces 5 from each other. In some embodiments, the face identifying features 8 may be provided on alternating ones of the artifact faces 5 around the artifact body 2. For example and without limitation, as shown in the drawings, in some embodiments a single face identifying feature 8 may be provided on a first one of the artifact faces 5. Two face identifying features 8 may be provided on a second one of the artifact faces 5. Three face identifying features 8 may be provided on a third one of the artifact faces 5. In other embodiments, at least one face identifying feature 8 may be provided on each of the artifact faces 5.

Figure 1:
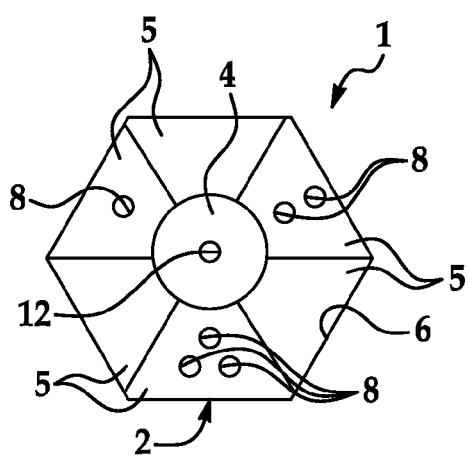
FIG. 1 is a top view of an illustrative embodiment of the prismatic alignment artifact.

As shown in FIG. 1, in some embodiments an adaptor opening 12 may be provided in the apex surface 4 of the artifact body 2 to receive a single point metrology device 14 for integrating multiple metrology systems in application of the prismatic alignment target 1. In some embodiments, the adaptor opening 12 may have a diameter of about ¼". In other embodiments, the adaptor opening 12 may have a larger or smaller diameter. In some applications of the prismatic alignment target 1, the metrology device 14 which is inserted in the adaptor opening 12 may be a laser tracker target. In other applications of the prismatic alignment target 1, the metrology device 14 may be a photogrammetry target, as will be hereinafter described.

In use, the prismatic alignment artifacts 1 may have the capability of easily and accurately aligning three-dimensional scans spanning large areas. In an exemplary application of the prismatic alignment artifact 1, multiple prismatic alignment artifacts 1 may be distributed over various portions of the fuselage panels 17 of the aircraft fuselage 16 or other surface to be measured or scanned. In some applications, the attachment surface 3 on the artifact body 2 of each prismatic alignment artifact 1 may be attached to a fuselage panel 17 using a vacuum device (not shown). In other embodiments, the attachment surface 3 may be attached to the fuselage panel 17 using an adhesive, a snap-fit and/or any other suitable attachment technique which is known to those skilled in the art. Any number of prismatic alignment artifacts 1 may be distributed over the aircraft fuselage 16 or other surface to be measured in any desired pattern.

A laser tracking device 20 may be placed at a selected distance from the aircraft fuselage 16. XYZ coordinates of the aircraft fuselage 16 may then be taken by emitting a laser beam 26 from the laser tracking device 20 against known aircraft features and also of each prismatic alignment artifact 1. The reflections of the laser beam 26 from the respective prismatic alignment artifacts 1 may be used to determine the locations of the respective prismatic alignment artifacts 1 relative to the aircraft coordinate system.

Figure 4:
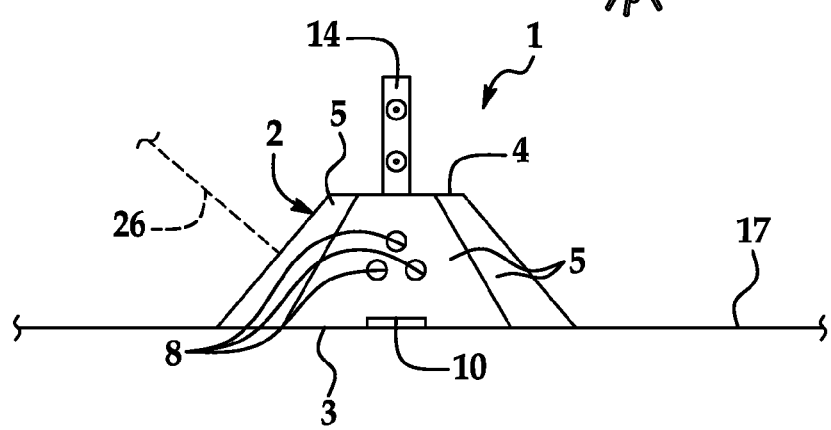
FIG. 4 is a side view of an illustrative embodiment of the prismatic alignment artifact, attached to a surface of the fuselage in typical implementation of the prismatic alignment artifact.
Figure 5:
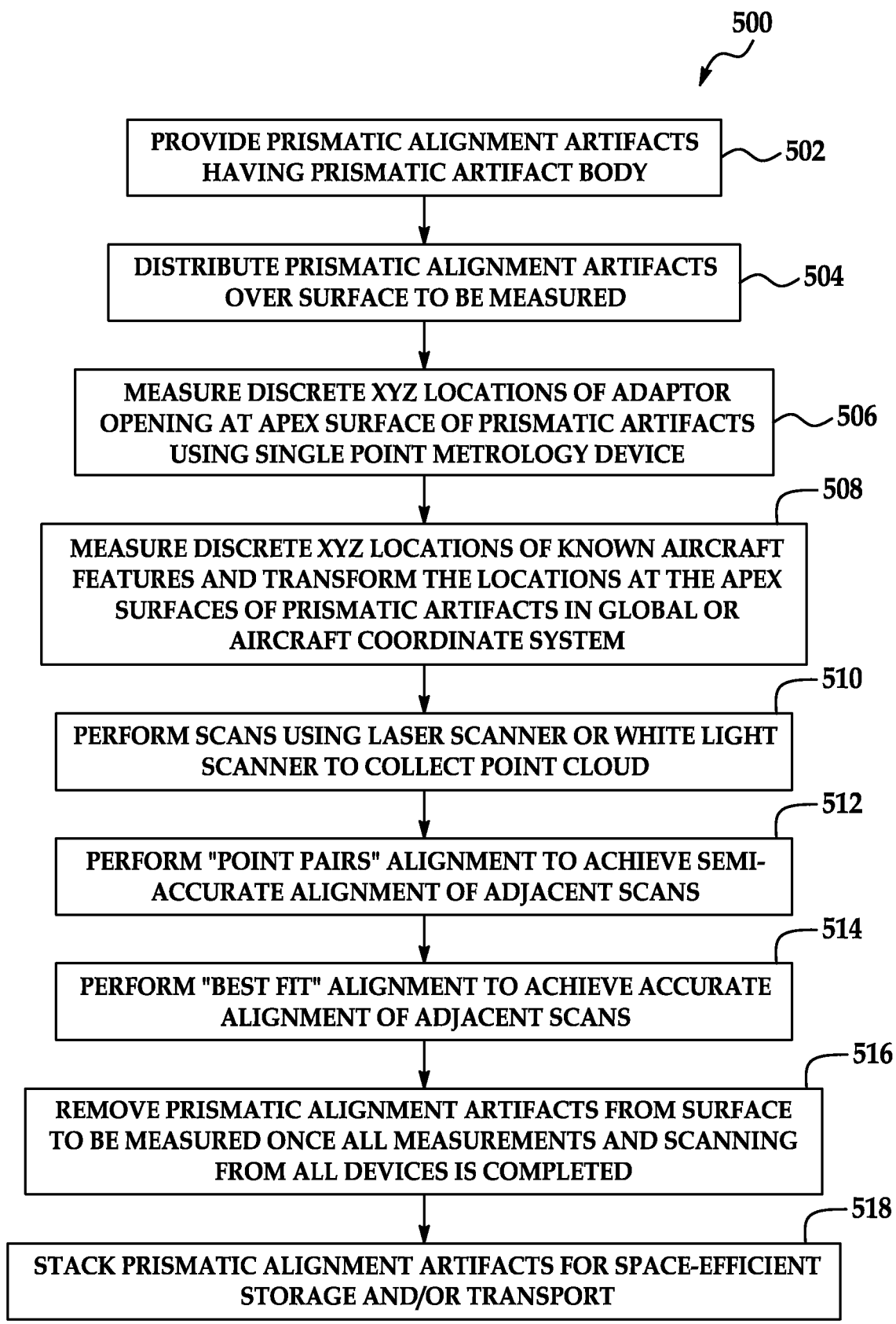
FIG. 5 is a flow diagram of an illustrative embodiment of a method of measuring a surface.

In some applications, multiple adjacent scans of the aircraft fuselage 16 may be taken using a laser scanner. The best fitting data of the adjacent scans may then be used to align adjacent three-dimensional scan data to each other. The face identifying features 8 on the artifact faces 5 of each prismatic alignment artifact 1 may facilitate ease in determining common points in the adjacent scans, forcing a single solution in best fitting data. As shown in FIG. 4, the prismatic shape of the prismatic alignment artifact 1 may allow for data from each prismatic alignment artifact 1 to be captured at much closer to the perpendicular relative to the laser scanning device 22 at any position of the laser scanning device 22.

As shown in FIGS. 3 and 4, in some applications determining the artifact locations may be carried out by placing a metrology device 14 of a high-accuracy metrology tool in the adaptor opening 12 of each prismatic alignment artifact 1. In some applications, the metrology device 14 may be a photogrammetry target. A photogrammetry device (not shown) may be provided on the aircraft fuselage 16 to facilitate three-dimensional scanning of the aircraft fuselage 16 using a combination of photogrammetry and laser tracking measurements. In other applications, each metrology device 14 may be a laser tracker target. Utilization of high-accuracy metrology tools may allow accurate positive location of the prismatic alignment artifacts 1 relative to the global coordinate system and may allow ease of integrating data from multiple scanner types as well as the capability to integrate data collected from high-speed, long-range laser scanners with data from multiple data collection devices.

After scanning of the aircraft fuselage 16 is completed, the prismatic alignment artifacts 1 may be removed from the fuselage panels 17 of the aircraft fuselage 16. In applications in which adhesive is used to secure the attachment surface 3 of each prismatic alignment artifact 1 to the fuselage panel 17, the prismatic alignment artifact 1 may be removed from the fuselage panel 17 by inserting a screwdriver or other tool (not shown) in the pry notch 10 of the artifact body 2 and prying the artifact body 2 from the fuselage panel 17. Multiple prismatic alignment artifacts 1 may be stored and/or transported to remote sites in a space-efficient manner by stacking the prismatic alignment artifacts 1.

Referring next to FIGS. 5-8, a flow diagram 500 (FIG. 5) which illustrates an illustrative embodiment of a method of measuring a surface such as that of an aircraft fuselage 30 (FIGS. 6-8), for example and without limitation, is shown. In block 502, prismatic alignment artifacts each having a prismatic artifact body may be provided. The prismatic artifact body of each prismatic alignment artifact may have the shapes and characteristics of the embodiments of the prismatic alignment artifact 1 which were heretofore described with respect to FIGS. 1-4. In block 504, the prismatic alignment artifacts may be distributed over a surface to be measured. In some applications, the surface to be measured may be an aircraft surface such as an aircraft fuselage 30 (FIGS. 6-8), for example and without limitation. For purposes of illustration and not limitation, the prismatic alignment artifacts may include a first prismatic alignment artifact 1a placed on a wall panel 31 of the aircraft fuselage 30 and a second prismatic alignment artifact 1b, a third prismatic alignment artifact 1c and a fourth prismatic alignment artifact 1d placed on respective window panels 32 of the aircraft fuselage 30. In other applications, the surface to be measured may be a non-aircraft surface. Each prismatic alignment artifact may be attached to the surface to be measured using magnets, an adhesive, a snap-fit and/or any other suitable attachment technique which is known to those skilled in the art.

Figure 6:
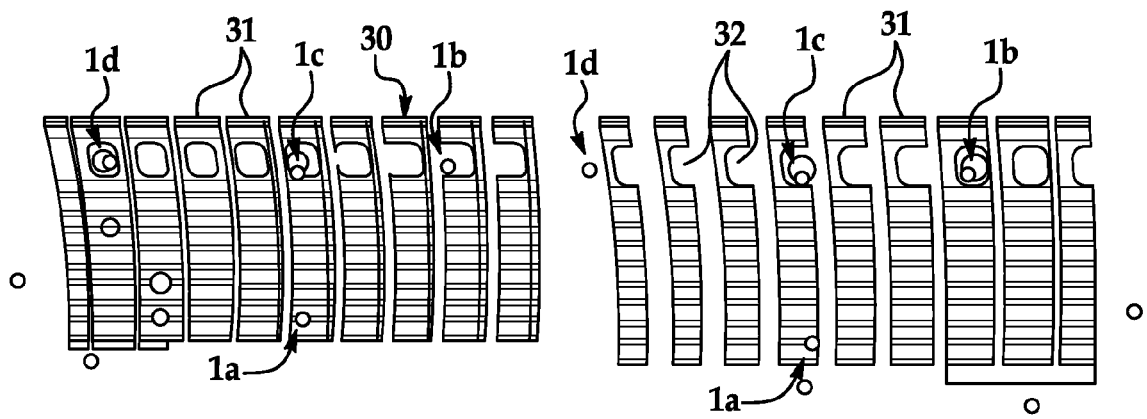
FIG. 6 illustrates two adjacent point clouds of an interior of an aircraft fuselage derived using a high-speed scanner, more particularly illustrating alignment points which are common in data sets corresponding to both point clouds in the semi-accurate alignment of the data sets using a "point pairs" alignment method.
Figure 7:
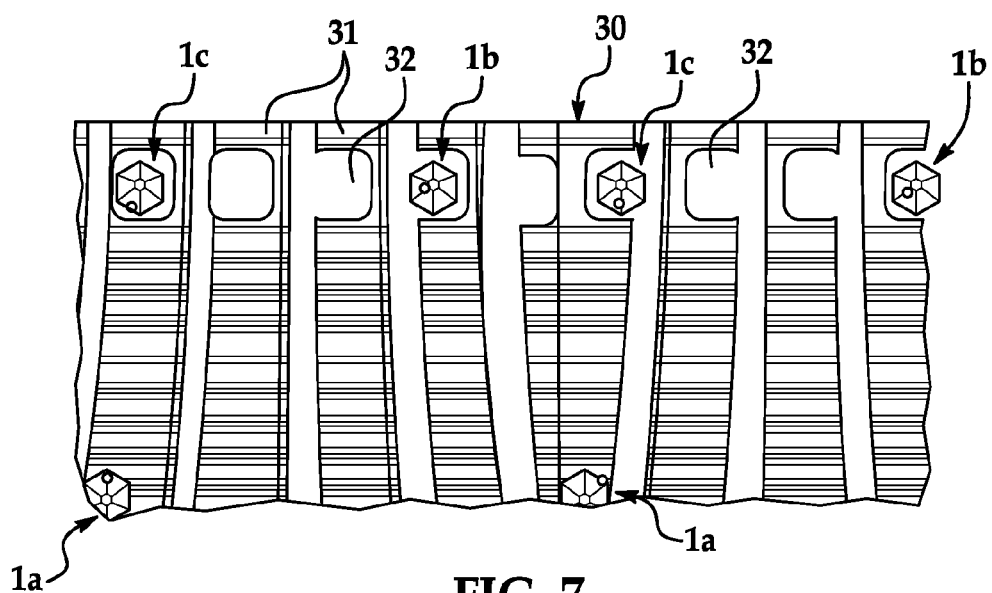
FIG. 7 is a zoomed view of the alignment points illustrated in FIG. 6, more particularly illustrating location of common points in the two sets of data using the prismatic alignment artifacts.
Figure 8:
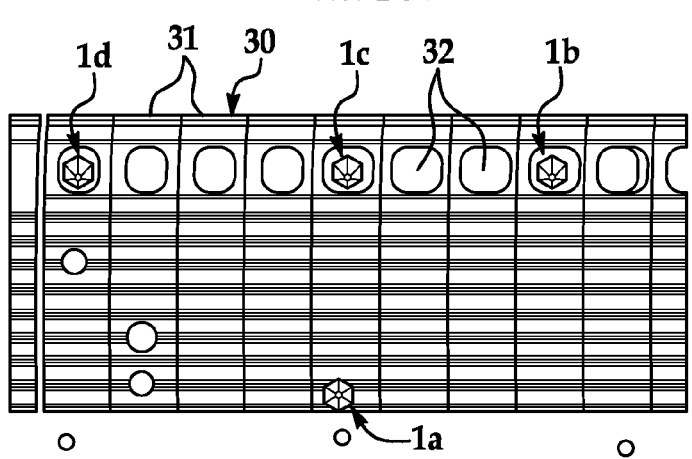
FIG. 8 illustrates the alignment points after "point pairs" alignment has been carried out.

In block 506, the discrete XYZ location of the adaptor opening at the apex surface of each prismatic alignment artifact may be measured using a single point metrology device. In some applications, the XYZ locations of the adaptor openings of the respective prismatic alignment artifacts on the surface to be measured may be carried out using laser tracking methods. In some applications, the locations of the adaptor openings of the respective prismatic alignment artifacts on the surface to be measured may be carried out using photogrammetry methods. In some applications, measurement of the locations of the prismatic alignment artifacts on the surface to be measured in block 506 may include taking multiple adjacent scans of the surface to be measured. In block 508, the discrete XYZ locations of known aircraft features on the aircraft fuselage 30 may be measured and the locations of the adaptor openings at the apex surfaces of the prismatic alignment artifacts as determined in block 506 may be transformed in a global or aircraft coordinate system. In block 510, scans may be performed such as by using at least one of a laser scanner and a white light scanner, for example and without limitation, to collect adjacent point clouds as shown in FIG. 6. In block 512, "point pairs" alignment may be performed to achieve semi-accurate alignment of the adjacent point clouds, as shown in FIG. 8. As shown in FIG. 7, the prismatic alignment artifacts 1a-1d may facilitate location of common points in the adjacent point clouds. In block 514, "best fit" alignment may be performed to achieve accurate alignment of the adjacent scans.

In block 516, the prismatic alignment artifacts may be removed from the surface to be measured after all measurements and scanning from all devices is completed. In some embodiments, a pry notch may be provided in the artifact body of each prismatic alignment artifact. Each prismatic alignment artifact may be pried from the surface to be measured by inserting a screwdriver or other tool in the pry notch. In block 518, multiple prismatic alignment artifacts may be stacked for space-efficient storage and/or transport.

Figure 9:
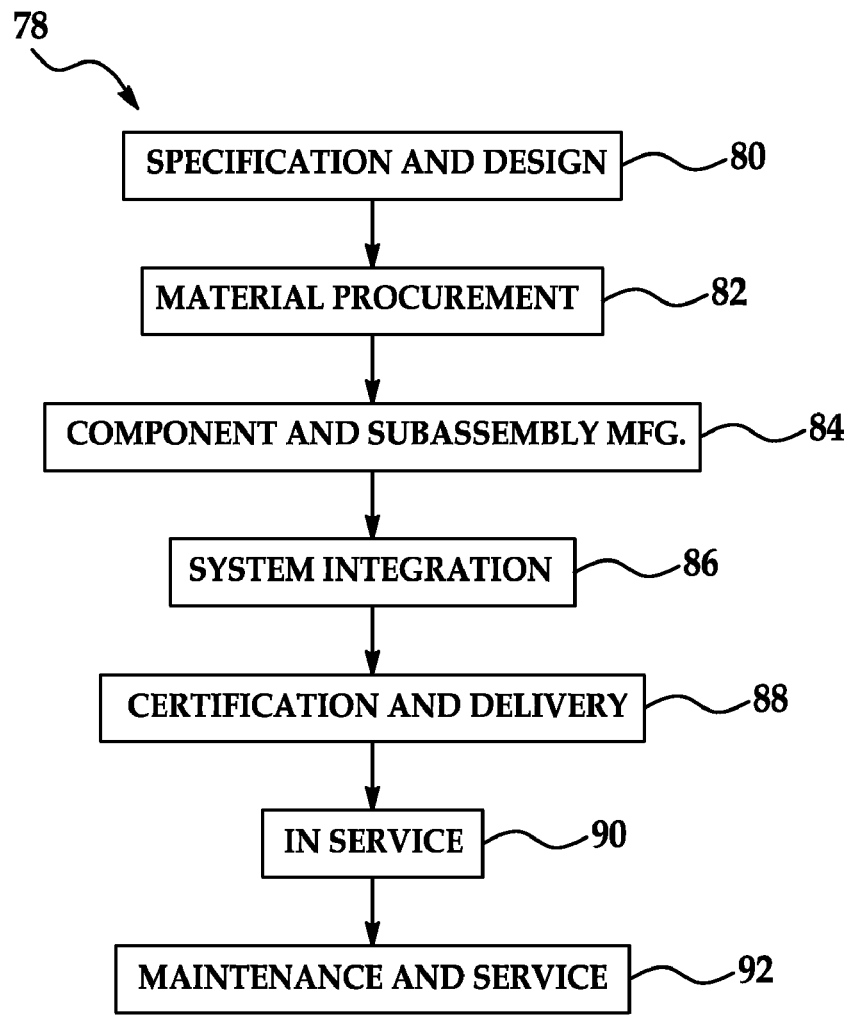
FIG. 9 is a flow diagram of an aircraft production and service methodology.
Figure 10:
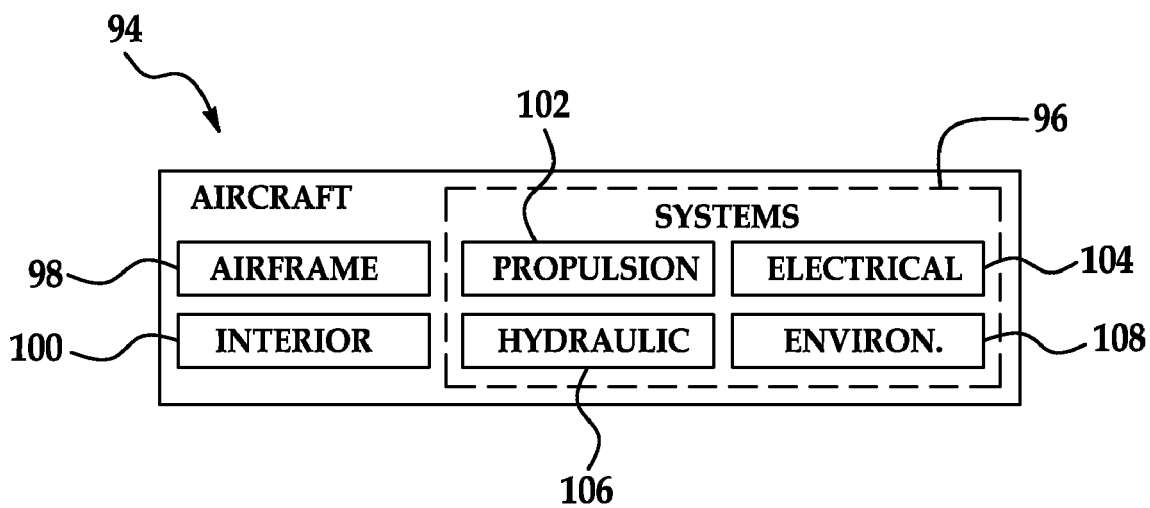
FIG. 10 is a block diagram of an aircraft.

Referring next to FIGS. 9 and 10, embodiments of the disclosure may be used in the context of an aircraft manufacturing and service method 78 as shown in FIG. 9 and an aircraft 94 as shown in FIG. 10. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 10, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A prismatic alignment artifact, comprising:
an artifact body having a prismatic shape to be positioned on a surface to be measured;
at least one face-identifying feature provided in at least one of a plurality of faces extending between an attachment surface of the artifact body and an apex surface of the artifact body, wherein the at least one face-identifying feature comprises an opening in a corresponding one of the faces; and
an aperture to receive a metrology device to measure a location of the artifact body on the surface.

2. The prismatic alignment artifact of claim 1, wherein the apex surface is spaced-apart from the attachment surface.

3. The prismatic alignment artifact of claim 1, further comprising at least one pry notch provided in the artifact body.

4. The prismatic alignment artifact of claim 1, wherein the metrology device is carried by the artifact body via the aperture.

5. The prismatic alignment artifact of claim, 1 wherein the metrology device comprises a laser tracking target.

6. The prismatic alignment artifact of claim 1, wherein the metrology device comprises a photogrammetry target.

7. The prismatic alignment artifact of claim 1, wherein a scanner collects adjacent point clouds of the surface using the artifact body, wherein a point pairs alignment is performed on the adjacent point clouds to achieve a first level of accuracy.

8. The prismatic alignment artifact of claim 7, wherein a best fit alignment is performed on the adjacent point clouds to achieve a second level of accuracy greater than the first level of accuracy.

9. A prismatic alignment artifact, comprising:
an artifact body having a prismatic shape and including:
a planar attachment surface;
a planar apex surface spaced apart from the attachment surface;
a plurality of faces extending between the attachment surface and the apex surface;
at least one face-identifying feature provided in at least one of the plurality of faces, wherein the at least one face-identifying feature comprises a number of openings in a corresponding one of the faces; and
an aperture provided in the apex surface to receive a metrology device for determination of a location of the artifact body on a surface via a scan to collect adjacent point clouds of the surface using the artifact body.

10. The prismatic alignment artifact of claim 9, further comprising at least one pry notch provided in the artifact body.

11. The prismatic alignment artifact of claim 9, wherein the metrology device comprises a laser tracking target.

12. The prismatic alignment artifact of claim 9, wherein the metrology device comprises a photogrammetry target.

13. The prismatic alignment artifact of claim 9, wherein a point pairs alignment is performed on the adjacent point clouds to a first accuracy.

14. The prismatic alignment artifact of claim 13, wherein a best fit alignment is performed on the adjacent point clouds to a second accuracy greater than the first accuracy.

15. A method of measuring a surface, comprising:
providing a plurality of prismatic alignment artifacts each having a prismatic artifact body;
distributing the prismatic alignment artifacts over a surface to be measured;
measuring locations of the prismatic alignment artifacts on the surface to be measured;
measuring locations of known features on the surface to be measured;
transforming the locations of the prismatic alignment artifacts in a global coordinate system;
collecting adjacent point clouds of the surface to be measured;
performing point pairs alignment to achieve semi-accurate alignment of the adjacent point clouds; and
performing best fit alignment to achieve accurate alignment of the adjacent point clouds.

16. The method of claim 15, wherein measuring locations of the prismatic alignment artifacts on the surface to be measured comprises measuring locations of the prismatic alignment artifacts on the surface using laser tracking.

17. The method of claim 15, wherein measuring locations of the prismatic alignment artifacts on the surface to be measured comprises measuring locations of said prismatic alignment artifacts on said surface using photogrammetry methods.

18. The method of claim 15, wherein distributing the prismatic alignment artifacts over the surface to be measured comprises distributing the prismatic alignment artifacts over an aircraft surface.

19. The method of claim 15, wherein distributing the prismatic alignment artifacts over the surface to be measured comprises distributing the prismatic alignment artifacts onto an exterior surface of a panel of an aircraft.

20. A prismatic alignment artifact, comprising:
an artifact body having a prismatic shape and including:
- a planar attachment surface;
- a planar apex surface spaced-apart from the attachment surface;
- six planar faces extending between the attachment surface and the apex surface with adjacent ones of the faces disposed at an obtuse angle with respect to each other;
- base edges defined between the attachment surface and the faces, respectively;
- a pry notch provided in one of the base edges;
- openings provided in alternating ones of the faces;
- wherein a first one of the openings is provided in a first one of the alternating ones of the faces, wherein second and third ones of the openings are provided in a second one of the alternating ones of the faces, and wherein fourth, fifth and sixth ones of the openings are provided in a third one of the alternating ones of the faces; and
- an aperture provided in the apex surface to receive a metrology device to measure a location of the artifact body on a surface to be measured, wherein a scanner is to collect adjacent point clouds of the surface using the artifact body, wherein a point pairs alignment is to be performed on the adjacent point clouds to a first accuracy, and wherein a best fit alignment is to be performed on the adjacent point clouds to a second accuracy greater than the first accuracy.

21. A method of measuring a surface, comprising:
providing a plurality of prismatic alignment artifacts each having a prismatic artifact body including:
- a generally planar attachment surface;
- a generally planar apex surface spaced-apart from the attachment surface;
- six generally planar artifact faces extending between the attachment surface and the apex surface with adjacent ones of the artifact faces disposed at an obtuse angle with respect to each other;
- base edges defined between the attachment surface and the artifact faces, respectively;
- at least one pry notch provided in at least one of the base edges;
- openings provided in alternating ones of the artifact faces;
- wherein the openings comprise one opening provided in a first one of the alternating ones of the artifact faces, two openings provided in a second one of the alternating ones of the artifact faces and three openings provided in a third one of the alternating ones of the artifact faces;
- an aperture provided in the apex surface; and
- a single point metrology device inserted in the aperture;

distributing the prismatic alignment artifacts over an aircraft surface to be measured;
measuring coordinate locations of the apertures of the prismatic alignment artifacts, respectively, on the aircraft surface to be measured using at least one of laser tracking and photogrammetry methods;
measuring coordinate locations of known features on the surface to be measured;
transforming the coordinate locations of the prismatic alignment artifacts in a global coordinate system;
collecting adjacent point clouds of the surface to be measured by performing scans using at least one of a laser scanner and a white light scanner;
performing point pairs alignment to achieve semi-accurate alignment of the adjacent point clouds; and
performing best fit alignment to achieve accurate alignment of the adjacent point clouds.

22. A method as defined in claim 21, further comprising removing the prismatic alignment artifacts from the aircraft surface to be measured and stacking the prismatic alignment artifacts.

* * * * *